United States Patent [19]

Hirota et al.

[11] Patent Number: 4,873,155
[45] Date of Patent: Oct. 10, 1989

[54] FUEL CELL MANIFOLDS

[75] Inventors: Toshio Hirota; Takashi Ohuchi; Osamu Yamamoto, all of Kanagawa, Japan

[73] Assignee: Fuji Electric Co., Ltd., Kanagawa, Japan

[21] Appl. No.: 268,921

[22] Filed: Nov. 9, 1988

[30] Foreign Application Priority Data

Nov. 10, 1987 [JP] Japan .................................. 62-283834
Oct. 18, 1988 [JP] Japan .................................. 63-261796

[51] Int. Cl.⁴ ............................................. H01M 8/02
[52] U.S. Cl. ......................................... 429/26; 429/38
[58] Field of Search ....................... 429/26, 34, 35, 36, 429/37, 38, 39

[56] References Cited

U.S. PATENT DOCUMENTS 4,508,793 4/1985 Kumata et al. ...................... 429/39
4,574,112 3/1986 Breault et al. ..................... 429/26

Primary Examiner—Donald L. Walton
Attorney, Agent, or Firm—Finnegan, Henderson, Farabow, Garrett & Dunner

[57] ABSTRACT

A fuel cell manifold mounted airtightly on the side walls of a fuel cell stack, the manifold comprising a seal layer covering the periphery of a wall of the fuel cell stack, a frame-shaped seal spacer having one side mounted airtightly on the seal layer and penetrated by a pipe carrying a cooling solution or electrolyte, and a box-shaped manifold cover mounted airtightly on the opposite side of the seal spacer. A second embodiment employs a hollow seal spacer that functions in place of the pipes carrying cooling solution or electrolyte.

4 Claims, 4 Drawing Sheets

FUEL CELL MANIFOLDS

BACKGROUND OF THE INVENTION

The present invention relates to manifolds for supplying reaction gases to a fuel cell made up of a stack of unitary cells, and for removing the reaction gases therefrom. More particularly, the invention relates to the structure of such manifolds wherein connecting parts of electrolyte and cooling solution piping may be accommodated.

In a conventional fuel cell stack made up of multiple individual cells, each cell comprises a fuel pole and an oxidizing agent pole with an electrolyte layer held between these poles, rib-shaped fuel gas chambers supply fuel gas to the fuel pole, and oxidizing gas chambers supply oxidizing gas to the oxidizing agent pole and exhaust the gases from the cell. The fuel gas chambers and the oxidizing gas chambers are usually positioned so that the former chambers are perpendicular to the latter chambers, and the manifolds for supplying and removing the reaction gases cover the four side walls of the fuel cell stacks.

Manifolds are used in such cells to accommodate connecting parts of electrolyte pipes for supplying or circulating electrolyte to the electrolyte layers. They are further used to connect parts of pipes carrying cooling solutions to and from cooling boards that are interposed between individual cells at certain intervals in the stack. Such cooling solution maintains the temperature of the cell suitably for the generation of electric power. The manifolds are also used as a space for the pipe connections.

FIG. 6 is a sectional view of a conventional fuel cell stack taken across the vertical axis of the stack and shows the manifolds 2, 3, 4 and 5. FIG. 7 is an enlarged sectional view showing essential components of one of the manifolds of FIG. 6. In these figures, fuel gas supplying and removing manifolds 2 and 3 are provided on a pair of opposite side walls of fuel cell stack 1, and oxidizing gas supplying and removing manifolds 4 and 5 are provided for the remaining pair of opposed side walls. Fuel gas supplying manifolds 2 and 3 include, respectively, fuel gas supplying inlet 2A and fuel gas removing outlet 3A, each connected to a fuel supplying and removing system, to circulate a fuel gas (for example, $H_2$) in the fuel gas chambers. Similarly, the oxidizing gas supplying and removing manifolds include respectively an oxidizing gas supplying inlet 4A and an oxidizing gas removing outlet 5A, connected to an oxidizing gas supplying and removing system, to circulate an oxidizing gas (for example, $O_2$) in the oxidizing gas chambers. The result of the circulation of these gases is the generation of electric power from the fuel cell.

Each manifold described above includes a manifold cover 8, comprising a rectangular frame 6 and a rectangular cover plate 7, along with sealing means 9 interposed between the wall of fuel cell stack 1 and frame 6. As shown in FIG. 7, an O-ring 6B is inserted in a groove formed in the frame 6, whereby frame 6 and cover plate 7 are detachably joined together with screws and are airtight.

Sealing means 9 for such a manifold have previously been proposed. As shown in FIG. 7, these comprise a seal layer 10 covering the periphery of the side wall of fuel cell stack 1; a groove 6C formed in the end of frame 6 opposite seal layer 10; and seal spacer 11, which may have an H-shaped section as shown in FIG. 7, interposed between seal layer 10 and groove 6C. Seal spacer 11 is made from a material having a coefficient of thermal expansion between that of fuel cell stack 1 and that of manifold cover 8. O-rings 12A and 12B are inserted between seal spacer 11 and seal layer 10, and between seal spacer 11 and frame 6, to seal the interfaces of these components. Seal spacer 11 releases the positional shift of fuel cell stack 1 relative to manifold cover 8 caused by the variation of the temperature of fuel cell stack 1 between room temperature and operating temperature (approximately 200° C.), thus preventing any loss of the seal that may be caused by the positional shift, and any damage to the packing members.

Fuel gas supplying and removing manifolds 2 and 3 accommodate an electrolyte supplying and removing pipe 22, and connecting pipes 23 connecting to pipe 22 and communicating with the unitary fuel cells. A penetrating portion 25 of pipe 22 passes through frame 6 of the manifold with an airtight interface.

In oxidizing gas supplying and removing manifolds 4 and 5, cooling solution charging and discharging pipe 19, connecting pipe 20, cooling solution manifolds 21, and a plurality of cooling pipes penetrating cooling boards in fuel cell stack 1 are accommodated such that they are suitably connected to one another, as known in the art. A penetrating portion 24 of a pipe for supplying cooling solution to the cooling solution charging and discharging pipe 19 passes through frame 6 of manifold cover 8 with an airtight seal.

In such a conventional fuel cell, the manifolds are used to accommodate the reaction gases, electrolyte and cooling solution charging and discharging pipes, and to provide a space for joining the supplying and removing pipes to the connecting pipes and for allowing the penetrating portions of the pipes and the manifold frame to interconnect, as just described. The interconnection of the penetrating portions must be carried out with frame 6 secured to fuel cell stack 1. Therefore, cover plate 7 is removed from frame 6 when this work is carried out.

These conventional fuel cell manifolds suffer from several problems. First, in order to accommodate the connecting parts of the piping, and especially the intricate electrolyte and cooling solution piping, the frame is unavoidably deep. The work efficiency of the manifold is lowered as a result. Moreover, since the manifold cover is divided into two parts, the number of sealing parts is necessarily increased as much, raising the possibility of impaired sealing performance.

In order to maintain sealing performance in these conventional cells it is necessary to increase the rigidity of manifold cover 8 as the manifold increases in size, and to provide a mechanically strong flange 6A on frame 6 so that frame 6 and cover plate 7 are sufficiently sealed. This method also undesirably increases the weight and manufacturing cost of manifold cover 8.

SUMMARY OF THE INVENTION

Accordingly, it is an object of the present invention to provide an improved structure over conventional manifolds provided for fuel cells.

Another object of the present invention is to provide a manifold for a fuel cell which will not obstruct a pipe connecting operation for a fuel cell, and which is both small in size and simple in construction.

A further object of the invention is to provide a manifold for a fuel cell which permits simplification of the connecting parts of piping.

In one aspect of the invention, the fuel cell manifold for supplying and removing reaction gases, mountable airtightly on the side walls of a fuel cell stack formed by stacking individual cells in a column, and in which electrolyte and cooling solutions are charged and discharged through pipes penetrating the manifold, comprises a seal layer covering the periphery of one of the walls of the fuel cell stack, a frame-shaped seal spacer having one side in airtight contact with the seal layer, the seal spacer including a bore for securing airtightly a penetrating portion of one of the pipes, and a manifold cover mounted airtightly on the opposite side of the seal spacer with a packing, the depth of the manifold cover being large enough to accommodate the pipes protruding from the seal spacer.

In another aspect of the invention, the fuel cell manifold for supplying and removing reaction gases, mountable airtightly on the side walls of a fuel cell stack formed by stacking individual cells in a column, comprises a seal layer covering the periphery of one of the walls of the fuel cell stack, a frame-shaped hollow seal spacer having one side in airtight contact with the seal layer, the interior of the hollow seal spacer being a cavity serving as an electrolyte or cooling solution charging and discharging passageway, and a manifold cover mounted airtightly on the opposite side of the hollow seal spacer with a packing.

DETAILED DESCRIPTION OF THE INVENTION

Figure 1:
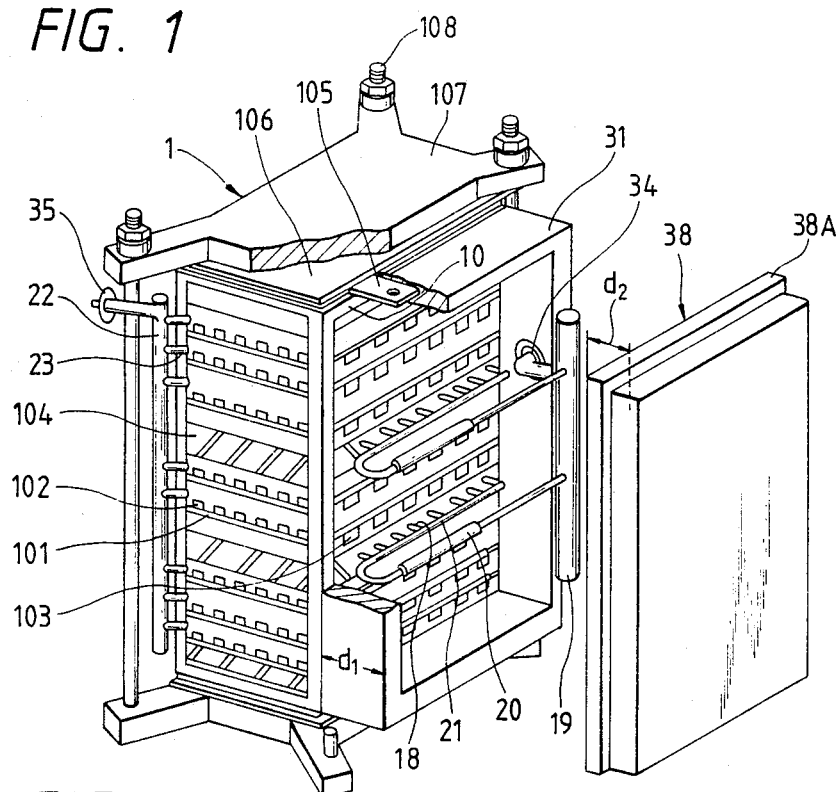
FIG. 1 is a perspective view (with cut away) of one embodiment of the manifolds for fuel cell according to the present invention.

The present invention provides reaction gas supplying and removing manifolds for a fuel cell in which the manifolds are mounted airtightly on the side walls of a fuel cell stack formed by stacking individual cells in a column, and in which electrolyte and cooling solution are charged and discharged through pipes penetrating the manifold, the manifold comprising a seal layer covering the periphery of one of the walls of the fuel cell stack, a frame-shaped seal spacer having one side in airtight contact with the seal layer, the seal spacer including a bore for securing airtightly a penetrating portion of one of the electrolyte or cooling solution pipes, and a manifold cover mounted airtightly on the opposite side of the seal spacer with a packing, the depth of the manifold cover being large enough to accommodate the pipes protruding from the seal spacer.

In another embodiment of the present invention, reaction gas supplying and removing manifolds for a fuel cell are mounted airtightly to the side walls of a fuel cell stack formed by stacking individual fuel cells in a column. Each manifold in this instance comprises a seal layer covering the periphery of one of the walls of the fuel cell stack, a frame-shaped hollow seal spacer having one side in airtight contact with the seal layer, the interior of the hollow seal spacer being a cavity serving as an electrolyte or cooling solution charging and discharging passageway, and a manifold cover mounted airtightly on the opposite side of the hollow seal spacer with a packing.

In the manifolds according to the present invention, the seal spacer acts to relieve the effects of thermal expansion or contraction of the sealing parts in the manifolds of a conventional fuel cell. The seal spacer is rectangular in section and larger in thickness (i.e., protrudes farther from the wall of the fuel cell stack) than such spacers in conventional manifolds to provide for the penetrating portion of the electrolyte or cooling solution charging and discharging pipe. Connecting parts of the electrolyte or cooling solution charging and discharging pipe which come outside the seal spacer are covered by the manifold cover, which has a unitary frame and cover plate deep enough to accommodate the connecting parts. Thus, pipe connecting parts may be welded in front of the seal spacer, eliminating the welding work space limitation found in known manifold designs. Further, the unitary manifold cover frame and cover plate reduces the number of sealing parts, resulting in superior sealing performance.

Additionally, the seal spacer serves as part of the wall of the manifold, and thus the manifold cover is reduced in depth and increased in rigidity. The manifold cover of the present invention is therefore smaller in size and weight than conventional covers. The flange of conventional designs is eliminated, resulting in a decrease in the number of manufacturing steps.

Furthermore, according to the present invention, a hollow seal spacer in the form of a picture frame may be provided so that the hollow spacer serves as an electrolyte or cooling solution charging and discharging passageway. Electrolyte charging and discharging pipes branching to the individual fuel cells in the fuel cell stack, or the cooling solution charging and discharging pipes branching to cooling boards in the fuel cell stack, can in this case be eliminated. The manifold can accordingly be reduced in size, and the pipe connecting work readily achieved.

A first embodiment of the present invention is described with reference to FIGS. 1 and 2. The fuel cell stack 1 illustrated is of the phosphoric acid type, but need not be so limited. In each of the individual cells 101 forming fuel cell stack 1, oxidizing gas chambers 102 and fuel gas chambers 103 are in the form of ribs made of carbon plates, known in the art as bipolar plates, arranged on an electrode substrate in such a manner that the oxidizing gas chambers 102 are perpendicular to the fuel gas chambers 103. Fuel cell stack 1 also includes cooling boards 104, inserted between the individual cells such that a cooling board occurs at predetermined intervals in fuel cell stack 1. At both ends of fuel cell stack 1, a current collecting board 105, an insulating board 106 and a tightening board 107 are stacked, in that order. Tightening boards 107 at both ends of fuel cell stack 1 are tightened with tightening rods 108.

An electrolyte charging and discharging pipe 22 having a penetrating portion 35 is provided on each of two opposite sides of fuel cell stack 1, communicating with oxidizing gas chambers 102. Pipe 22 is connected through connecting pipe 23 to an electrolyte holding matrix (not shown) in each individual cell 101. On each side of fuel cell stack 1, and communicating with the fuel gas chambers 103, are a cooling solution charging and discharging pipe 19 having a penetrating portion 34, and cooling solution manifolds 21 connected to the ends of cooling pipes 18, which penetrate the cooling boards 104 in the direction of the layers of fuel cell stack 1. It should be noted that connecting (for example, by welding) connecting pipes 20 to cooling solution manifolds 21 and the cooling solution charging and discharging pipe 19 can be performed only after the fuel cell has been assembled. Likewise, connecting electrolyte connecting pipes 23 to the electrolyte charging and discharging pipe 22 and the individual cells 101 can be performed only after the fuel cell has been assembled.

Figure 2:
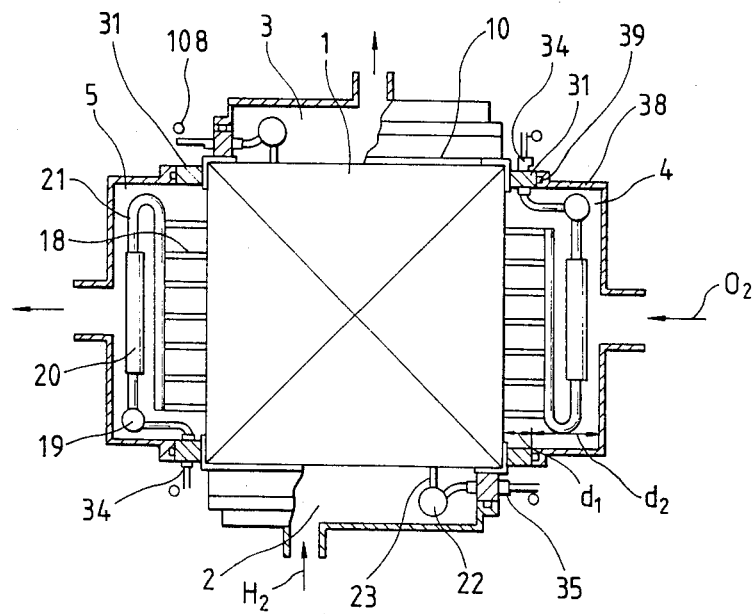
FIG. 2 is a sectional view (with cut away) taken across the vertical axis of the fuel cell shown in FIG. 1.

Still referring to FIGS. 1 and 2, a seal layer 10 covers the peripheral portions and corners of fuel cell stack 1. Seal layer 10 is preferably composed of, for instance, a fluororesin. Seal spacers 31 are arranged so that one side of each spacer is in airtight contact with the surface of seal layer 10, whereby the fuel cell stack and the seal spacers 31 are held airtight. A tightening structure for providing sealing pressure is not shown in the figures. Sealing pressure may be achieved, for instance, by a method in which protrusions are formed on the sides of seal spacers 31, and the seal spacers are tightened through the protrusions thus formed by tightening bolts.

Seal spacers 31 are in the forms of frames having depth $d_1$ large enough to securely hold penetrating portion 34 or 35, which pass through bore 39 in seal spacer 31. A manifold cover 38 is provided for each of seal spacers 31 such that the manifold cover is in close contact with the opposite side of seal spacer 31 from seal layer 10. Depth $d_2$ of seal cover 38 is large enough to accommodate piping protruding from seal spacer 31. Manifold cover 38 and seal spacer 31 are held airtight with a packing 39, such as an O-ring 39 fitted into a groove 38C formed in flange 38A of manifold cover 38. A tightening structure for providing sealing pressure for manifold cover 38 is not shown, but is known to those skilled in the art. Manifold covers 38 may be tightened against seal spacers 31 or against manifold cover flanges 38A, as described above for the seal spacer/seal layer interface.

Figure 3:
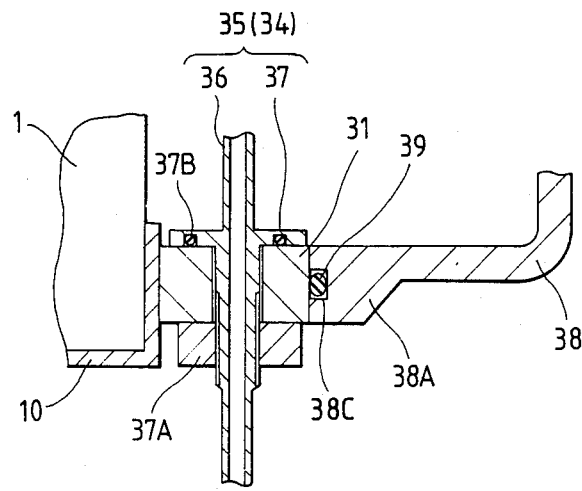
FIG. 3 is an enlarged sectional view showing essential components of the manifold depicted in FIGS. 1 and 2.

As shown in FIG. 3, seal spacer 31 is rectangular in cross section and is disposed between seal layer 10 on fuel cell stack 1 and flange 38A of manifold cover 38, into which flange packing 39 is fitted. Seal spacer 31 and flange 38A are held airtight with a tightening member (not shown) applying a tightening load thereto. Thermal stress applied to these sealing parts by thermal expansion or contraction can be released by forming seal spacer 31 from a material having a linear thermal expansion coefficient with a value between that for the fuel cell 101 (made essentially of carbon fiber) and that for manifold cover 38 (made preferably from a fluororesincoated iron material).

Penetrating portions 34 or 35 have an airtight interface with seal spacer 31 as shown in FIG. 3. That is, a pipe 36 penetrating a flange 37 is welded airtightly to the flange, and inserted into a bore 39 formed in seal spacer 31, and pipe 36 thus inserted is fixed with a lock nut 37A. The interface of flange 37 and seal spacer 31 is sealed with a packing 37B, whereby the electrolyte or cooling solution can be charged and discharged and the manifold held airtight. When the penetrating portions 34 and 35 are secured to the respective spacers 31, the cooling solution charging and discharging pipes 19 and 20 are supported in position. Connecting pipes 20 and 30 can therefore be readily connected using the large area provided by removal of manifold cover 38. If depth $d_1$ of the seal spacer 31 is set to the minimum value necessary for installing penetrating portions 34 and 35, associated piping protrudes from seal spacer 31, and connection of the connecting pipes can be more readily achieved.

Figure 4:
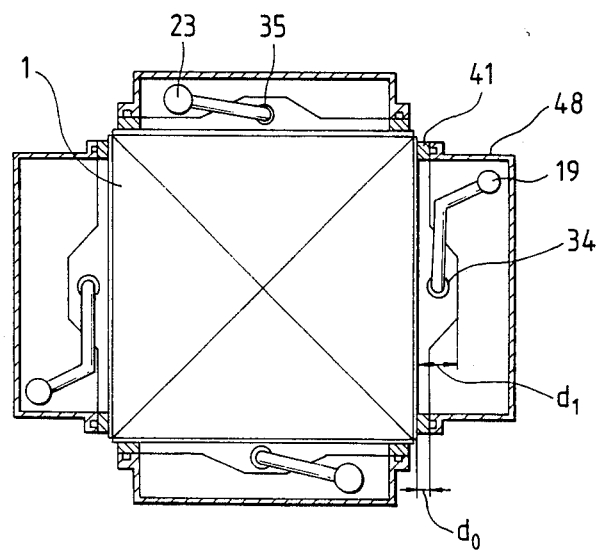
FIG. 4 is a sectional view (with cut away) of a second embodiment of manifolds for a fuel cell according to the present invention.

FIG. 4 illustrates another embodiment of the present invention. This embodiment differs from the embodiments of FIGS. 1-3 in that in FIG. 4, a portion of seal spacer 41 protrudes in the form of a trapezoid from fuel cell 1 toward manifold cover 48, such that that portion of seal spacer 41 including penetrating portion 34 or 35 has depth $d_1$ while the manifold cover is U-shaped in section, and other portions of seal spacer 41 are $d_0$ in depth, wherein $d_0$ is a minimum value required for sealing. In this embodiment, the effect of seal spacer 41 on access to the pipe connecting work is more effectively eliminated than in the previously described embodiment. The cost of the seal spacer due to the use of materials such as nickel steel for a desired linear expansion coefficient can be minimized by the reduction in weight associated with this embodiment.

Figure 5:
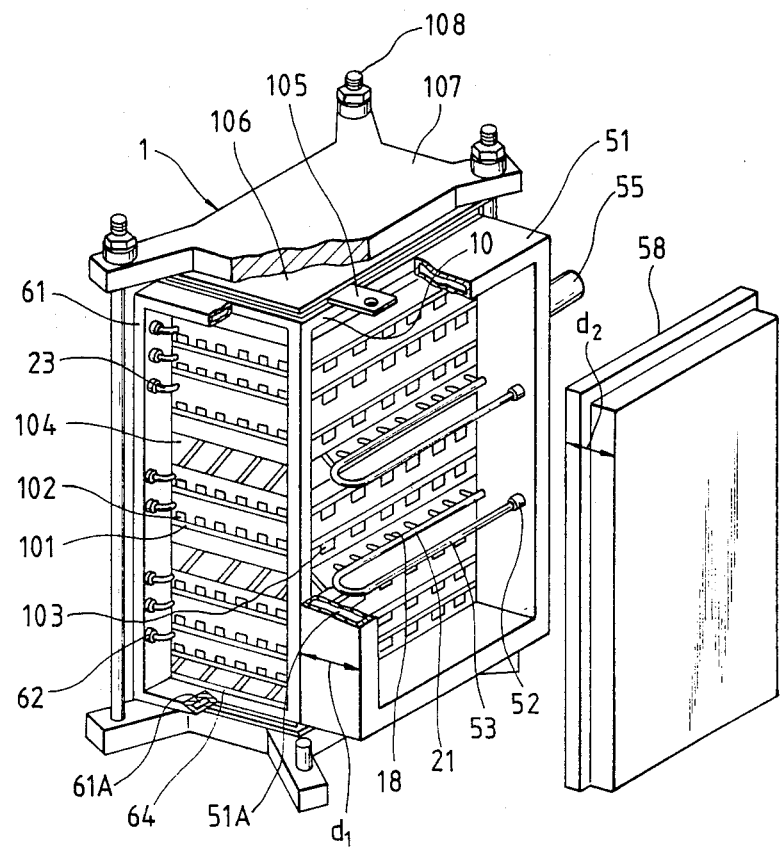
FIG. 5 is a perspective view (with cut away) of a third embodiment of manifolds according to the present invention.
Figure 6:
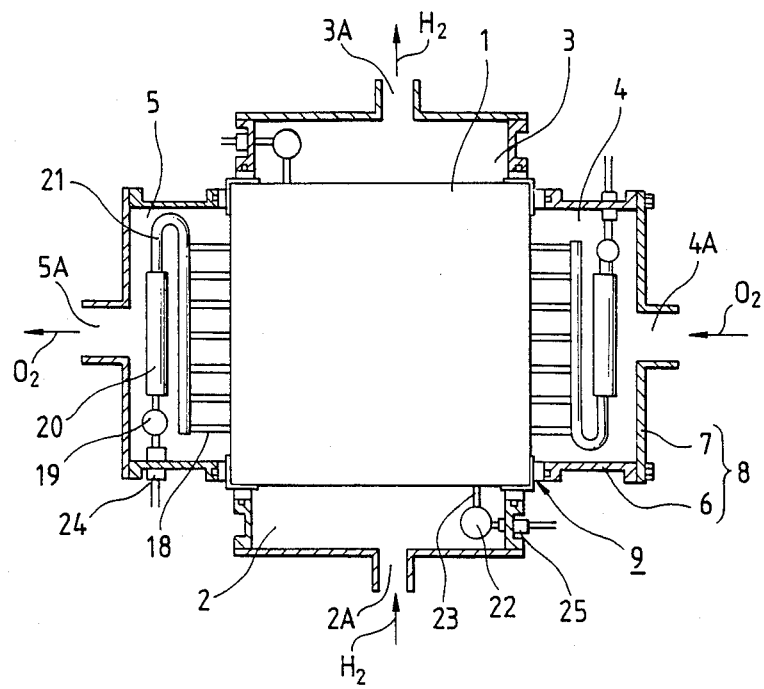
FIG. 6 is a sectional view (with cut away) showing conventional manifolds for a fuel cell; and, FIG. 7 is an enlarged sectional view showing essential components of the manifold shown in FIG. 6.
Figure 7:
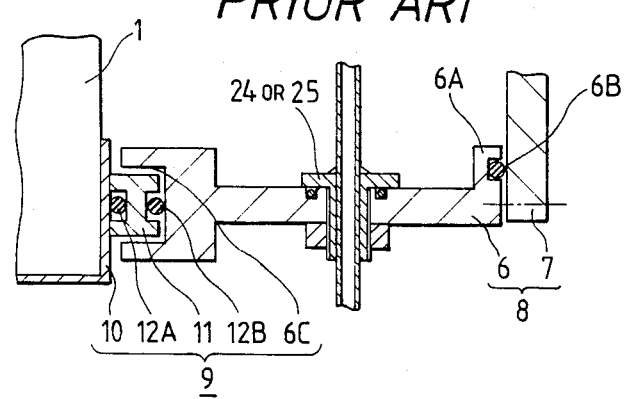

A third embodiment of the invention is shown in FIG. 5. In FIG. 5, a hollow seal spacer 51 is provided on each of the cooling solution charging and discharging sides of fuel cell stack 1. Hollow seal spacer 51 is in the form of a frame and is rectangular in section, the interior of hollow seal spacer 51 forming a cavity 51A. One side of hollow seal spacer 51 is in airtight contact with seal layer 10 of fuel cell stack 1, while the other side is in airtight contact with manifold cover 58, forming an oxidizing gas supplying and removing manifold. Hollow seal spacer 51 includes a plurality of connecting fittings 52 on its inner wall, which are connected to manifold connecting pipes 53. Manifold connecting pipes 53 are extensions of the cooling solution manifolds 21. Cooling solution is supplied into cavity 51A through an inlet pipe 55 and is supplied through manifold connecting pipes 53 to cooling pipes 18 in cooling boards 104. Cooling solution is then discharged through a discharging hollow seal spacer (not shown) arranged on the opposite side of fuel cell stack 1 in the same configuration as just described.

Further in FIG. 5, a hollow seal spacer 61 is provided on the electrolyte supplying side of fuel cell stack 1. Hollow seal spacer 61 is formed from a fluororesin high in electrolyte resistance, or a fluororesin-coated metal material. Hollow seal spacer 61 is in the form of a frame, having an interior cavity 61A. Electrolyte holding material 64, such as carbon fibers or phenol fibers, is inserted into the cavity 61A in a quantity that will not obstruct the flow of electrolyte. A plurality of connecting fittings 62 are provided on an inner wall of the hollow seal spacer 61. These connecting fittings 62 are connected to electrolyte connecting pipes 23, so that electrolyte is supplied through connecting pipes 23 to individual cells 101.

The joining of connecting fittings 62 to electrolyte connecting pipes 23 and the joining of connecting fittings 52 to connecting pipes 53 of the cooling solution manifolds 21, may be achieved, for example, by welding, in the case when these connecting pipes are made from a metal (for example, a stainless steel alloy). As another example, these connections may be made by flareless joints when the connecting pipes are heat resistant hoses (for example, fluororesin tubes). A third example of the type of connection useful in the present invention, in the case when the connecting pipes are thermal contraction tubes, is by a method of blowing hot air onto the thermal contraction tube place on the connecting fitting.

In a fuel cell thus constructed, cavity 51A of hollow seal spacer 51 on the cooling solution side of fuel cell stack 1 functions in place of cooling solution charging and discharging pipe 19 of the embodiment shown in FIG. 1, and the provision of the connecting fittings 52 eliminates the connecting pipes 20 of the embodiment shown in FIG. 1. As a result, the cooling pipe connecting structure is greatly simplified, and the manifold depth can therefore be reduced without adversely affecting the pipe connecting work efficiency. Accordingly, the depth $d_1$ of hollow seal spacer 51 depends on the sectional area of cavity 51A in hollow seal spacer 51, which is used to charge and discharge the cooling solution. The depth $d_2$ of manifold cover 58 can be reduced insofar as the connecting structure is simplified, as described above.

Similarly, hollow seal spacer 61 on the electrolyte side of fuel cell stack 1, and its interior cavity 61A, function as the electrolyte charging and discharging pipe 22 of the embodiment shown in FIG. 1. Hollow seal spacer 61 thus provides the same beneficial effects on the electrolyte side of fuel cell stack 1 as hollow seal spacer 51 does on the cooling solution side of fuel cell stack 1. In addition, since the electrolyte in cavity 61A is supplied to individual cells 101 at all times, it is unnecessary for each individual cell to have an electrolyte reservoir or port, as in conventional fuel cells. Accordingly, use of hollow seal spacers 61 has the effect that a sufficiently large quantity of electrolyte can be supplied for a long period of time so that the individual cells and the fuel cell stack can be run continuously for long periods of time.

As a result of the manifold described herein, connection of the cooling solution or electrolyte supplying and removing pipe is carried out with the manifold cover removed, exposing a relatively large part of the supplying and removing pipes so that a large working space is provided. Connecting pipes can be welded, for instance, with the supplying and removing pipe supported by the penetration part fixedly secured to the seal spacer. Thus, the pipe connecting work can be performed with higher efficiency than in conventional manifolds.

In addition, the difficulties accompanying the conventional fuel cell in which the manifold cover is divided into the frame and the cover plate for provision of the working space (i.e., the increase of the number of sealing parts, the increased size of the manifold cover, and the associated increased manufacturing costs) are avoided in the present invention. Thus, the present invention provides a fuel cell with manifolds which are small in size, simple in construction, and high in sealing reliability, and in which the pipe connecting work can be readily achieved.

When the linear expansion coefficient of the seal spacer is selected to be between those of the fuel cell stack and the manifold cover in order to relieve thermal stress acting on the sealing surface, the seal spacer may desirably be formed by using material such as nickel steel. The depth of the seal spacer in this case may therefore be selected so that the portion of the seal spacer in which the penetrating portion of the charging and discharging pipes are secured airtightly is thick enough to support the penetrating portion, and the remainder of the seal spacer is small in thickness. The cost of the material used for the seal spacer may thus be minimized.

In another embodiment of the invention, a hollow seal spacer is provided. The cavity in each seal spacer functions in place of cooling solution or electrolyte supplying and removing pipe of other embodiments. Through use of the hollow seal spacer, the pipe connecting structure accommodated in the manifold and the pipe connecting work can be further simplified. Specifically, in fuel cells employing manifolds according to the invention which include the hollow seal spacers disclosed herein, the pipe connecting work can be performed easily, the manifolds can be reduced in size, and a sufficiently large quantity of electrolyte can be continuously supplied to the individual fuel cells to permit continuous operation.

Although the present invention has been described in terms of specific embodiments and examples, it will be apparent to one skilled in the art that variuos modifications may be made to those embodiments without departing from the scope of the appended claims and their equivalents. Accordingly, the present invention is not limited to the specific embodiments or examples disclosed herein.

What is claimed is:

1. A fuel cell manifold for supplying and removing reaction gases, mountable airtightly on the side walls of a fuel cell stack formed by stacking individual cells in a column, and in which electrolyte and cooling solution are charged and discharged through pipes penetrating the manifold, the manifold comprising:
   a seal layer covering the periphery of one of the walls of the fuel cell stack;
   a frame-shaped seal spacer having one side in airtight contact with the seal layer, the seal spacer including a bore for securing airtightly a penetrating portion of one of the pipes; and,
   a manifold cover mounted airtightly on the opposite side of the seal spacer with a packing, the depth of the manifold cover being large enough to accommodate the pipes protruding from the seal spacer.

2. A fuel cell manifold as claimed in claim 1, wherein the seal spacer is composed of a material having a thermal expansion coefficient with a value between that of the fuel cell stack and that of the manifold cover.

3. A fuel cell manifold for supplying and removing reaction gases, mountable airtightly on the side walls of a fuel cell stack formed by stacking individual cells in a column, the manifold comprising:
   a seal layer covering the periphery of one of the walls of the fuel cell stack;
   a frame-shaped hollow seal spacer having one side in airtight contact with the seal layer, the interior of the hollow seal spacer being a cavity serving as an electrolyte or cooling solution charging and discharging passageway; and,
   a manifold cover mounted airtightly on the opposite side of the hollow seal spacer with a packing.

4. A fuel cell manifold as claimed in claim 3, wherein the hollow seal spacer is composed of a material having a thermal expansion coefficient with a value between that of the fuel cell stack and that of the manifold cover.

* * * * *